United States Patent [19]

Bortolini et al.

[11] Patent Number: 4,635,249
[45] Date of Patent: Jan. 6, 1987

[54] GLITCHLESS CLOCK SIGNAL CONTROL CIRCUIT FOR A DUPLICATED SYSTEM

[75] Inventors: Edward J. Bortolini, Fort Collins; John S. Helton, Lafayette; Dwight W. Kohs, Broomfield, all of Colo.

[73] Assignee: AT&T Information Systems Inc., Holmdel, N.J.

[21] Appl. No.: 730,385

[22] Filed: May 3, 1985

[51] Int. Cl.[4] .................... H04Q 11/04; H04L 7/00
[52] U.S. Cl. ...................................... 370/58; 375/108
[58] Field of Search ............... 370/58, 100; 375/107, 375/108

[56] References Cited

U.S. PATENT DOCUMENTS

| | | | |
|---|---|---|---|
| 4,144,448 | 3/1979 | Piscotta et al. | 375/108 |
| 4,386,323 | 5/1983 | Jansen | 375/108 |
| 4,412,342 | 10/1983 | Khan et al. | 375/107 |
| 4,563,767 | 1/1986 | Brandt | 375/108 |
| 4,580,259 | 4/1986 | Harada et al. | 370/58 |

Primary Examiner—Douglas W. Olms
Assistant Examiner—Curtis Kuntz
Attorney, Agent, or Firm—Donald M. Duft

[57] ABSTRACT

A control circuit for receiving clock signals from duplicated sources, such as a pair of Time Slot Interchanges (TSI) and for normally extending the clock signal of the on-line source to clock signal utilization devices, such as digital port boards. The control circuit contains circuitry which ensures that no spurious pulses are applied to the port boards when the TSIs interchange their on-line/off-line status.

25 Claims, 10 Drawing Figures

DIGITAL SWITCHING SYSTEM 100

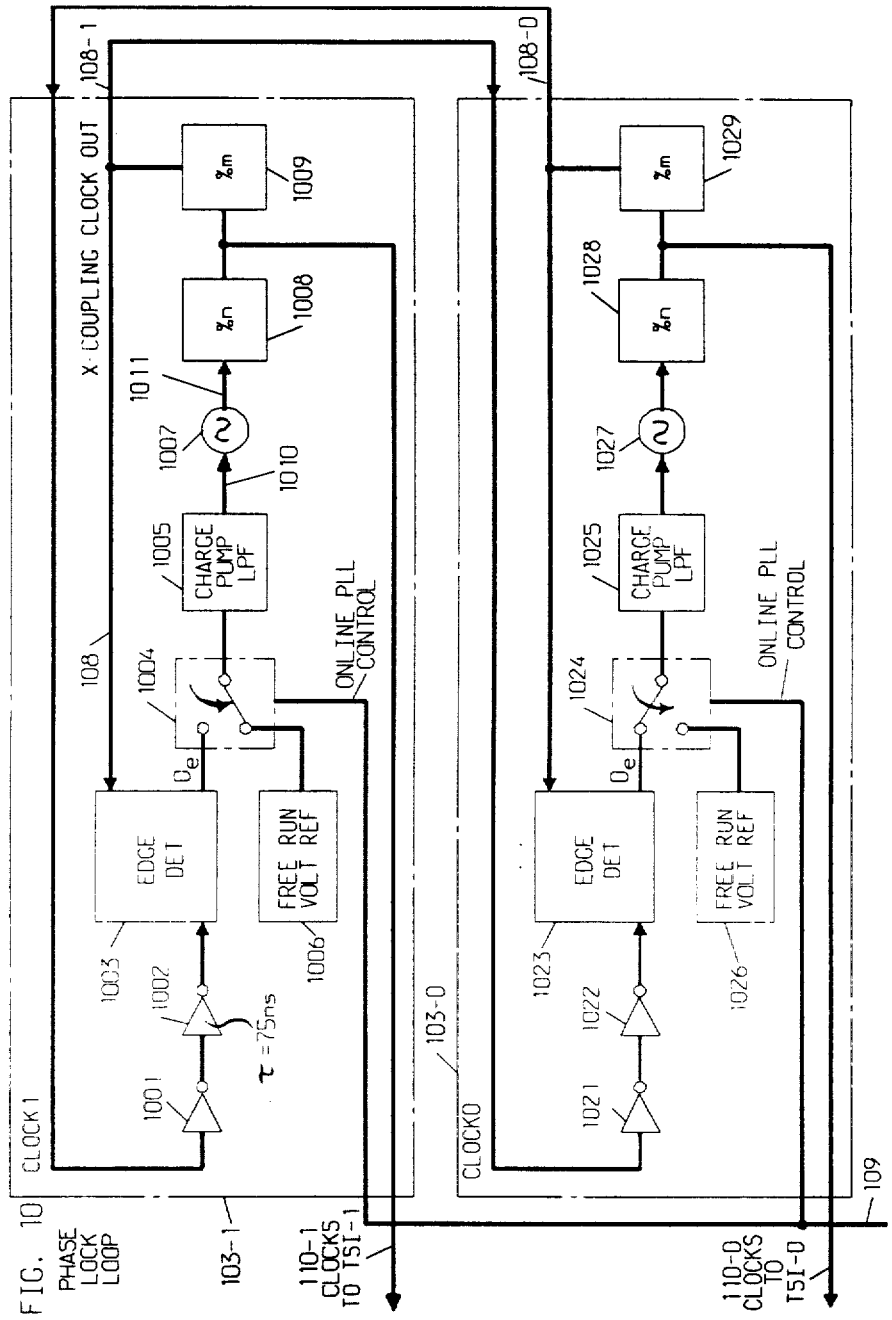

GLITCHLESS CLOCK SIGNAL CONTROL CIRCUIT FOR A DUPLICATED SYSTEM

TECHNICAL FIELD

This invention relates to a switching system and, in particular, to a system having duplicated facilities operated on an on-line/off-line basis. This invention further relates to a system having facilities for avoiding transients or disturbances to the speech and/or data signals carried by the system when the duplicated facilities switch their on-line/off-line state.

BACKGROUND OF THE INVENTION

It is known to provide switching systems with duplicated facilities operated on an on-line/off-line basis. This is done to increase system reliability. The off-line unit is always available as a spare in case the on-line unit malfunctions.

It is common practice in duplicated systems to "exercise" the off-line unit by periodically switching the on-line/off-line status of the duplicated facilities as a preventative maintenance measure. This ensures that an operable spare is always available. The status switching of the duplicated units is usually performed during periods of light traffic, such as at 2:00 a.m. This is done to minimize any possible service disturbances or interruptions that might be encountered if the switching were done when the system is serving heavy traffic.

The switching of duplicated facilities results in little or no service degradation to "voice" traffic since, at the most, only a "click" is heard by parties to existing connections. The problem is more serious in PCM type systems serving data traffic. In these, a perturbation caused by a status switch that would cause only a "click" on a voice traffic connection could cause data to be lost or mutilated on a data connection. It is no solution to perform the status switch at 2:00 a.m. since, unlike voice traffic, data traffic can be high at any time of the day or night.

System designers attempt to overcome the above problems by synchronizing, to the extent possible, the phase and frequency of the clock signal sources in the duplicated units of PCM systems. However, it is not economically feasible to achieve the precision required in phase and frequency synchronization so that, without more, no clock signal perturbation results that could adversely affect data traffic.

Thus, it is still a problem in switching systems serving data traffic to switch the on-line/off-line status of duplicated facilities without momentarily degrading data traffic.

SUMMARY OF THE INVENTION

We provide a switching system that can switch the on-line/off-line status of duplicated facilities without any resulting perturbation or glitches in data traffic then being served by the system. In PCM type systems, the main cause of data mutilation is a glitch in the clock signal applied to the port boards. The port board circuitry is typically edge driven by square wave signals. A glitch can constitute an additional, and unwanted, square wave that can cause the port boards to go out of sync momentarily with respect to the rest of the system, such as the time slot interchangers.

A switch of the on-line/off-line status of duplicated facilities containing clock sources can cause a glitch in the clock signal applied to the port boards since the control circuitry that generates the port board clock signal switches the control of its operation from the former on-line clock source to the new on-line clock source upon the occurrence of each status switch. Glitches can occur during the status switch since phase and frequency synchronization between the two clock sources is rarely ideal.

Our invention solves the above described problem by providing facilities including a port board clock control circuit (herein termed a port data interface or PDI) that:

1. Receives a signal commanding a status switch of the duplicated facilities.
2. Monitors the off-line clock signal to detect the time slot 0 bit 0 time of the off-line clock.
3. Monitors the status switching of the duplicated facilities after the time slot 0 bit 0 time of the off-line clock is detected.
4. Controls the port board clock signal so that it is free from glitches during the duration of the status switching.

More specifically, the PDI receives a status switch request from the system controller and monitors the off-line clock until a trailing edge (the end) of the off-line time slot 0 bit 0 signal is first detected. The signal representing the request to effect the status switch is latched into the PDI control circuitry at that time. The clock signal generated by the PDI and applied to the port boards continues to follow the current on-line clock for the time being. Next, the beginning (a low) of the time slot 0 bit 0 time of the current on-line clock is detected. The port board clock signal goes low as it continues to follow the low of the current on-line clock. In response to this detection, the PDI control circuit generates a "bridge" signal which holds the port board clock signal low.

Buffers that control which clock signal source controls the generation of port board clock signal by the PDI are switched by appropriate inhibit and enable signals. These signals inhibited the buffers that serve the clock source that is being removed from an on-line status and they now enable the buffers that serve the clock signal source that is being switched from on-line to off-line. The bridge signal, however, remains extant and continues to hold the port board clock signal low during this time interval.

The bridge signal is terminated upon the detection of the beginning (a low) of the time slot 0 bit 0 time of the clock signal that is being switched from off-line to on-line. This time slot 0 bit 0 signal is then low. The termination of the bridge signal lets the port board clock signal follow the new on-line clock signal which is now low.

In summary, the status switching begins while the port board clock signal is still following the current on-line clock signal which goes low upon the beginning of its time slot 0 bit 0 time. The bridge signal is then generated and it holds the port board clock signal low during the switching of status between the two clocks. The bridge signal is removed upon the end of this switching operation when a low representing the start of the time slot 0 bit 0 time of the new on-line clock is detected. The port board clock signal then follows the low of the new on-line clock and thereafter follows all transitions of the new on-line clock.

Thus, the port board clock signal goes low at the beginning of the status switch upon the detection of the beginning of the time slot 0 bit 0 portion of the current on-line clock which then controls the generation of the port board clock signal then. The port board clock signal remains low from the bridge signal applied during the status switching interval. At the end of the switching interval, the port board clock signal remains low as it follows of the new on-line clock signal which at this time begins its time slot 0 bit 0 time (a low). The port board clock signal thus encounters no glitches or unwanted additional square waves during the switching between the two clocks since it is low the entire interval during which the control of its generation switches from the former to the new on-line clock source.

A feature of the invention is that the phase of the two clock sources is controlled so that the phase of the on-line clock leads that of the off-line clock by a controlled amount, such as 75 nanoseconds. This interval gives the PDI time to detect the low of the time slot 0 bit 0 time of the original on-line clock, generate a bridge signal to hold the port clock signal low during the time interval of the switch and remove the bridge signal to let the port board clock signal remain low upon the beginning of the time slot 0 bit 0 time of the new on-line clock which now controls the generation of the port board clock signal.

The phase of the duplicated clocks is shifted after a status switch so that the phase of the new on-line clock soon leads the phase of the new off-line clocks by 75 nanoseconds. The shift in the phase of the two clocks occurs within a few seconds after the switch in the status of the two clocks.

Our invention provides glitch free status switching facilities for a duplicated switching system so that data served by the system during the occurrence of the status switch is not lost or mutilated.

BRIEF DESCRIPTION OF THE DRAWING

These and other advantages of the invention will become apparent from the following detailed description of an exemplary embodiment thereof when read in conjunction with the accompanying drawings in which:

FIG. 10 discloses the duplicated clock sources.

DETAILED DESCRIPTION

Figure 1:
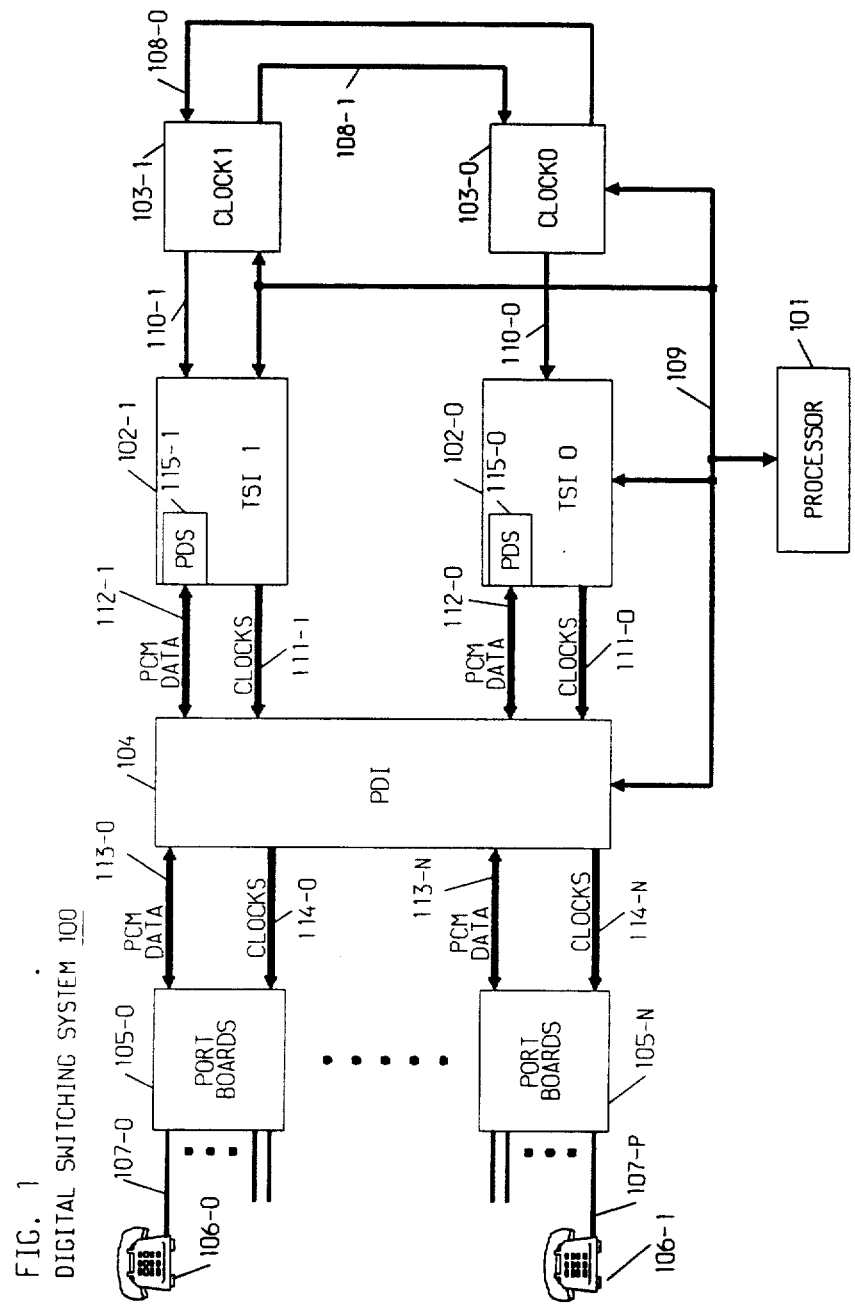
FIG. 1 is a block diagram of this system.

FIG. 1 discloses a switching system 100 embodying the invention. Shown on FIG. 1 are processor 101, duplicated time slot interchangers (TSI's) 102-1 and 102-0, duplicated clocks 103-1 and 103-0, port data interface (PDI) 104, a plurality of port boards 105-0 through 105-N and a plurality of lines 107-0 through 107-P serving a corresponding plurality of stations 106.

The function of switching system 100 is to serve call connections between the various stations 106 and lines 107 connected to the port boards 105. On each call connection, signals are generated at a first station 106, extended over a line 107, through its port board 105 to PDI 104, and from there extended to a TSI 102. The TSI functions to receive information from a first station 106 on a first system time slot; transfer the received information to a second time slot and transmit the transferred information via the PDI and appropriate port board and over a line 107 to the other station 106 involved on the call. The other station 106 also transmits information via the same paths in the second time slot to the TSI which transfers this information to the first time slot and applies it to the first station 106 on the call.

The system operates under control of processor 101 which is a stored program controlled device having appropriate memory and computational and logic circuits to control the operation of the entire system. The interconnection between processor 101 and the various circuits it controls is via bus 109 which extends between processor 101, PDI 104, TSI's 102, and clocks 103. Bus 109 comprises an I/O portion, a control portion, an address/response portion, a clock portion and a maintenance portion. Processor 101 also includes a scanner which evaluates the system responses to the various commands and control signals generated by the processor.

The function of each clock 103 is to apply timing signals to its associated TSI 102 over path 110. The TSI uses these clock signals to control its operation and, also transmits the received clock signals over an associated path 111 to PDI 104. The PDI extends the received clock signal over path 114 to port boards 105. PDI 104 and the port boards 105 require the clock signals so that they too can operate in a controlled manner and in synchronism with the TSI's. The speech/data or other intelligence generated at each station and transmitted over a line 107 to its associated port board 105 is converted to PCM data, under control of the clock signals on paths 114, and transmitted over paths 113 to PDI 104 and from there, over path 112 to a TSI. The TSI performs its time-slot interchange function and sends the PCM data it receives to the other station involved on the call over the same paths.

The disclosed Digital Switching System 100 is of the duplicated type in that it has two TSI's 102 and two clocks 103. This duplication increases system reliability in the event of errors or malfunctions in one of the duplicated devices. In duplicated systems, one duplicated device is usually considered to be on-line while the other is considered to be off-line. The off-line device is switched to on-line in the event that the diagnostic facilities of the processor determine that an abnormality currently exists in the on-line device. The status of the duplicated devices is then switched and the malfunctioning device remains off-line until maintenance personnel correct its abnormalities.

Path 108-0 applies timing signals from clock 103-0 to clock 103-1. Path 108-1 applies timing signals from clock 103-1 to clock 103-0. The purpose of this exchange of timing signals is to create a specified phase relationship between the signals generated by the two clocks and applied over paths 110 to TSI's 102. As is subsequently described in detail, this specified timing relationship must be precisely maintained in order to ensure that data is transmitted through the system without error when a switch occurs in the on-line/off-line status of the two TSI's 102 and clocks 103. This status switching of the two TSI's and clocks is performed in such a manner by the present invention so that no data is altered, mutilated or lost. This is desirable for voice services so that parties on call do not hear distortion or a click when switching of the state of the two TSI's occurs. This not only desirable, but is a necessity for data service so that data is not mutilated or lost.

Figure 2:
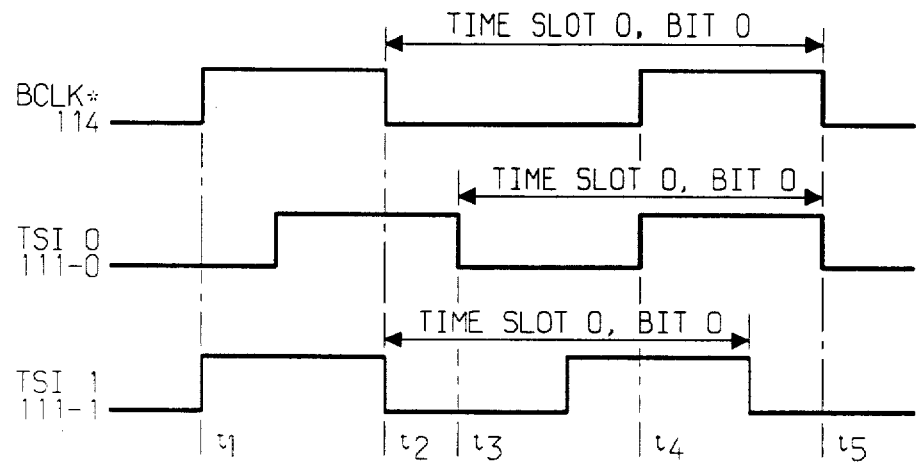
FIGS. 2 & 3 illustrate system wave forms.

The time relationship of the various clock signals of the FIG. 1 system is shown on FIG. 2. The signals on the lower two lines designated TSI 0 and TSI 1 are the clock signals generated by clock 103-0, and clock 103-1, and applied over paths 110 to their associated TSIs. Each TSI propagates the receive clock signals through it and over paths 111 to PDI 104. The PDI 104 thus receives both signals TSI 0 and TSI 1. One of the functions of the PDI is to receive these two signals and to derive a resultant signal termed BCLK* which is shown on the top line of FIG. 2. It is the BCLK* signal that is applied to the port boards 105 over paths 114 to control the operation of port circuits mounted on the boards.

During the interval of the status switch, the BCLK* signal keeps the port board circuitry in synchronism with the circuits of the rest of the system including the on line TSI 102. The port board circuitry is transition driven in that the ports perform a first function upon the receipt of a trailing edge of a BCLK* signal and a second function upon the receipt of a leading edge of the BCLK* signal. These functions of the port boards have to do with the exchange of data between the port boards and the PCM paths 113. This data exchange must take place at precisely controlled times so that the system does not alter or lose data. With respect to FIG. 2, the ports 105 perform their first function when a trailing edge of the BCLK* signal is detected at time t2 and their second function when a leading edge is detected at time t4.

Let it be initially assumed with respect to FIG. 2 that TSI 1 (102-1) is on-line. In this condition, PDI 104 receives signal TSI 1 over path 111-1 and generates a BCLK* signal which exactly corresponds to the TSI 1 signal. This situation exists at time t1 and persists through time t2. Let it be assumed that processor 101 has sent a command over bus 109 to order the two TSI's to switch their on-line/off-line states so that TSI 0 (102-0) will become the new on-line TSI. This requires that PDI alter its operation so that the TSI 0 signal, rather than the TSI 1 signal, assumes control of the generation of the BCLK* signal.

At time t2, the on-line/off-line status switch of the TSI's has not yet taken place, so the BLCK* signal follows the low transition of the TSI 1 signal. Control circuitry of the PDI monitors both of the TSI 0 and TSI 1 signals between times t2 and t3 and looks for the trailing edge of the TSI 0 signal. As can be seen on FIG. 2, the TSI 0 signal is phase delayed with respect to the TSI 1 signal by a controlled amount. From time t2 until shortly before time t3, the BLCK* signal follows the low of the TSI 1 signal. At time t3, PDI 104 detects the trailing edge of the TSI 0 signal and alters its operation so that the BCLK* signal remains low and follows the low of the TSI 0 signal from time t3 through t4. From time t4 on, the BCLK* signal follows the TSI 0 signal so long as TSI 0 (102-0) remains the on-line TSI. The interval between times t2 to t3 is herein termed the bridge interval.

FIG. 2 illustrates a glitchless status switch between on-line and off-line TSI's. The switch is glitchless since at time t5, which is the end of the status switch interval, the new on-line TSI 0 is terminating its time slot 0 bit 0 time of the TSI 0 signal and so are the port port boards 105 since they are controlled by the BCLK* Signal. This means that TSI 0 and the port boards are still in sync.

The port boards are transition driven, rather than duration driven, devices. Being transition driven, they remain in synchronous operation with the new on-line TSI 102 when a switch occurs. At time t2 of FIG. 2, the BCLK* signal undergoes a trailing edge transition as a result of a similar transition of the current on-line TSI 1 signal. The next transition of the BCLK* signal, a leading edge transition, appears at time t4 as a result of the leading edge transition of the new on-line TSI 0 signal. Synchronism is maintained between the BCLK* signal and the signal of the new on-line TSI signal between times t2 and t5 since the BCLK* signal undergoes only 1 trailing edge transition and only one leading edge transition. So do the TSI signals. This enables the transition driven circuits of the PDI and the port boards to remain in synchronism with the original on-line TSI 102-1 at time t2 and the new on-line TSI 102-0 at times t4 et seq.

It is true that the time interval from time t2 to t5 is of longer duration than is the interval from the time t2 to the next trailing edge of the TSI 1 signal or the corresponding interval of the TSI 0 signal from time t3 to t5. However, this extended interval from time t2 to t5 of the BCLK* signal is of no concern since the circuits on the port boards are transition driven rather than duration driven.

Figure 3:
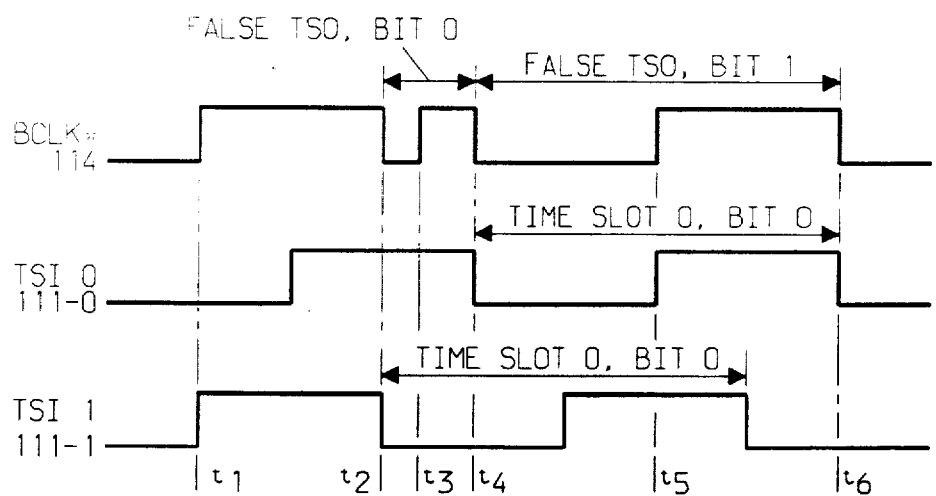

FIG. 3 illustrates signals which could cause a "bad" switch of on-line/off-line devices. This "bad" switch could cause data to be lost or mutilated as described in the subsequent paragraphs.

The bottom two signals of FIG. 3 correspond to the bottom two signals of FIG. 2. The top signal of FIG. 3, the BCLK* signal, illustrates how data could be lost if the BCLK* signal blindly followed the current on-line TSI signal without any intelligent control by the PDI as the status switch of TSIs takes place. Assume again that TSI 1 is initially the on-line TSI. This being the case, at time t1 the BCLK* signal follows the TSI 1 signal. Assume that a command to switch TSIs is received by the PDI aftertime T1. At time t2 the TSI 1 signal undergoes a negative transition and the BCLK* signal follows the low of the TSI 1 signal until time t3. At time t3 let it be assumed that the PDI circuitry responds to the command to switch and switches its operation so that the BCLK* signal immediately follows the TSI 0 signal from the new on-line TSI 102-0. This being the case, at time t3 the BCLK* signal switches from a low to a high and then continues to follow the TSI 0 signal. The switching from a low to a high at time t3 throws the PDI and the port board circuitry out of synchronization with the new on-line TSI 0 signal.

In partial summary, from time t2 to time t4 the portrayed BCLK* signal of FIG. 3 undergoes a trailing edge transition at time t2 and a leading edge transition at time t3 followed by another trailing edge transition at time t4. This constitutes a complete bit interval for the transition driven circuits of the PDI and the port boards. From time t4 to time t6, the BCLK* signal also encounters another trailing edge transition and leading edge transition. These constitute yet another bit interval. However, comparing the TSI 0 signal and the BCLK* signal, it can be seen that at time t4 the BCLK* signal has terminated its perceived time slot bit 0 interval while the TSI 0 signal is beginning its time slot 0 bit 0 interval. Similarly, at time t6 the BCLK* signal is terminating its false TS 0 bit 1 interval while the system, including TSI 0 102-0, is concluding its time slot 0 bit 0 interval. This is the true interval in which the system is operating. This being the case, if the circuits were permitted to operate in this manner during a switch of duplicated facilities, data would be lost or altered since the new on-line TSI is now out of synchronization with the circuitry of the PDI 104 and the port boards 105.

This would represent an undesirable situation that could cause the loss or mutilation of data.

The circuitry of the present invention provides signals of the type portrayed on FIG. 2 which permits glitch-free switching wherein, after a status switch of the TSIs, the new on-line TSI remains in synchronism with the BCLK* signal and the circuitry of the port boards.

Figure 4:
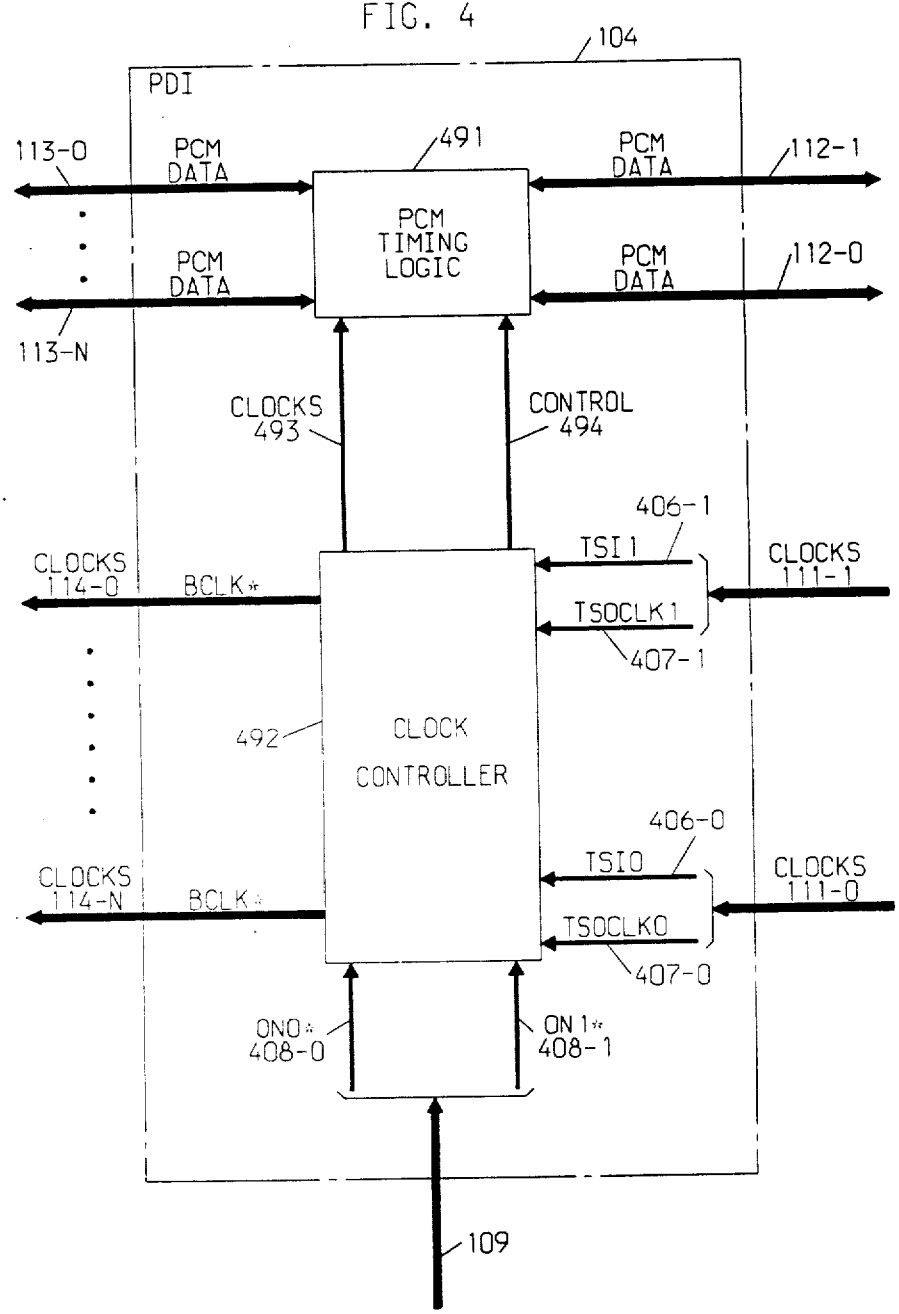
FIG. 4 discloses details of the PDI.

FIG. 4 illustrates further details of PDI 104. As shown on FIG. 4, PDI 104 comprises PCM Timing Logic 491 and Clock Controller 492. Timing logic 491 exchanges PCM data with the two TSI's via paths 112-1 and 112-0 on its right and exchanges PCM data with the port boards via paths 113-0 through 113-N on its left. The timing signals and clock signals required by timing logic 419 are supplied to it from controller 492 via clock path 493 and control path 494.

Clock Controller 492 applies BCLK* signals to the ports over paths 114-0 through 114-N. The BCLK* signals are shown on FIGS. 2 and 3 and are the clock signals that cause the ports to exchange PDM data with paths 113 at the proper time.

Clock Controller 492 receives signals over paths 109, 111-0 and 111-1. Path 109 supplies signals designated ON1* and ON0* over paths 408-1 and 408-0. It is these signals that tell controller 492 which TSI is on-line and which is off-line. The ON0* and ON1* signals are generated by processor 101 and applied to controller 492 over path 109.

Each Path 111 comprises a TSI 1 or TSI 0 signal on paths 406-1 or 406-0 together with a TSOCLK1 signal or TSOCLK0 signal on paths 407-1 or 407-0. The TSI 1 and TSI 0 signals are shown on FIGS. 2 and 3. These are the main clock signals from the TSIs and are used to control the timing of the PCM data exchanged between each TSI and PDI 104. The TSOCLK0 and TSOCLK1 signals on paths 107-0 and 407-1 are a special clock signal which specify the beginning of each frame of time slots.

The disclosed TSIs 102 advantageously may be of the type shown in the R. Whitmore U.S. Pat. No. 448,549 issued 11-27-84. The Whitmore TSI operates by dividing time into a series of cyclically recurring frame intervals. Each frame interval comprises a plurality of time slots and each time slot, in turn, is divided into a plurality of bits, say for example 8. It is necessary in the timing and operation of the TSI that clock signals be provided to indicate when a new frame begins. The instant of time in which a new frame begins is referred to as time slot 0 of the plurality of time slots in a TS1 frame. It is also bit time 0 for the plurality of bits (8) comprising time slot 0. The TSOCLK0 and TSOCLK1 clock signals are required by controller 492 so that it can switch the TSI that is currently on-line to an off-line status and vice versa only during the frame 0, bit 0 time.

Figure 5:
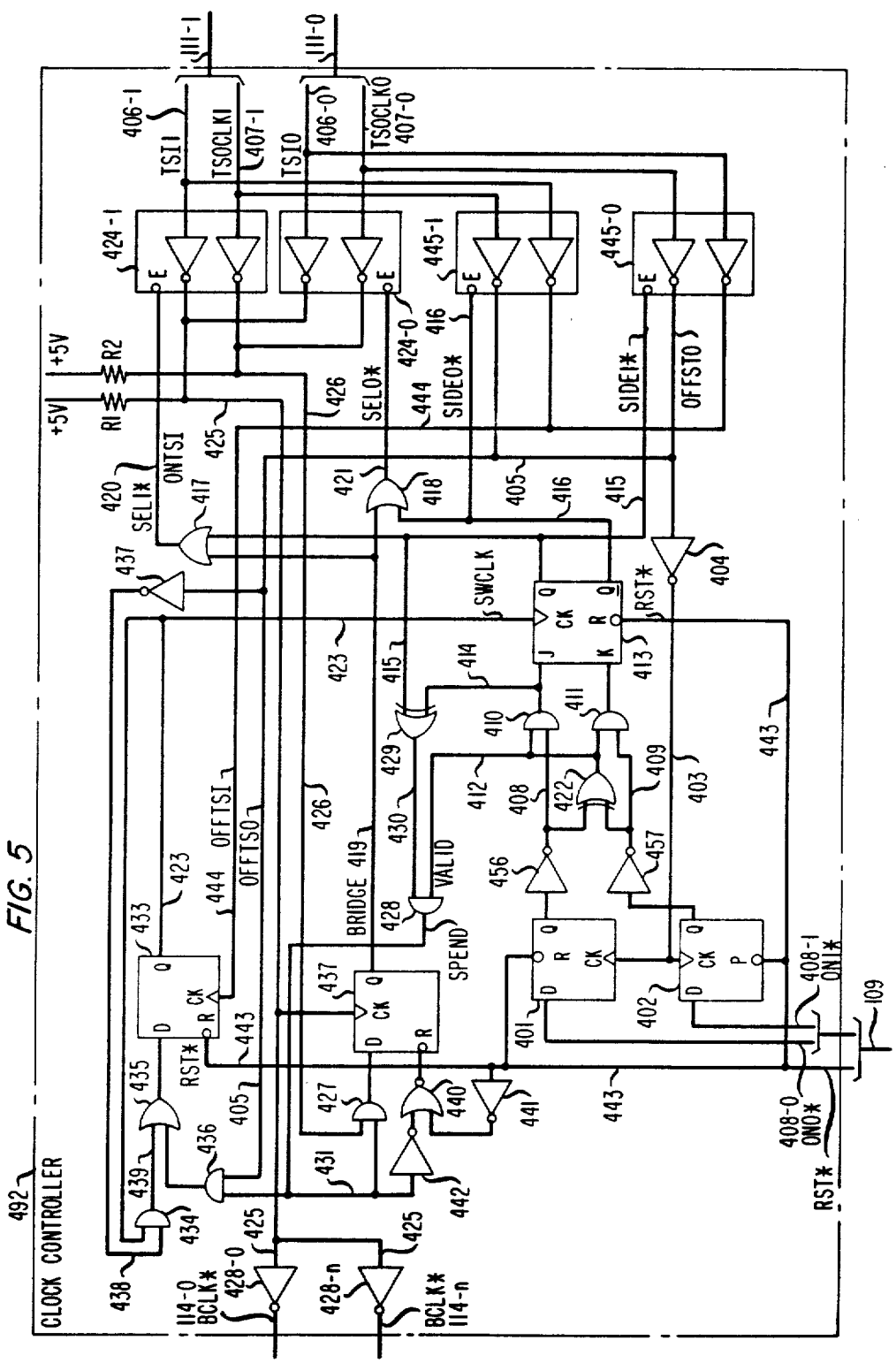
FIG. 5 discloses details of the PDI clock controller.

FIG. 5 discloses the details of the clock controller 492 circuitry concerned with receiving clock signals from the two TSI's and, in turn, applying a BCLK* clock signal to the port boards. In particular, element 492 receives clock signals from the two TSI's over paths 111-0 and 111-1. It processes these signals and applies a derived BCLK* signal over paths 114 to the port boards to control their operation as described in connection with FIGS. 2, 3 and 4.

When the two TSI's are not in the process of switching their on-line/off-line status, the main function of controller 492 is to receive clock signals from the on-line TSI over a path 111 and apply a resultant derived BCLK* clock signal over paths 114 to the port boards. When the two TSI's are in the process of changing state, the function of controller 492 is to monitor the TSI 1 and TSI 0 clock signals received from the TSIs and switch from the clock signals of the original on-line TSI to clocks signals of the new on-line TSIs at the appropriate time so that the resultant derived BCLK* clock signal applied to the port boards over paths 114 will have the proper timing so that no data transmitted from or directed to the port boards at the time of the TSI switch is lost or altered. The criticality of this timing has already been described in connection with FIGS. 2 and 3.

As already mentioned, the clock signals received by controller 492 from each TSI comprises the TSI 1 signal on path 406-1, for example, together with the TSOCLK1 signal on path 407-1 which indicates the time at which bit 0 of time slot 0 occurs in TSI 102-1. This latter signal is needed for the synchronous operation of controller 492. Corresponding signals are received on path 111-0 from TSI 102-0. Controller 492 also receives signals over leads 408-0 and 408-1 from the processor indicating which TSI should be on-line and which TSI should be off-line.

In order to describe the operation of the circuit of FIG. 5 let it initially be assumed that TSI 102-1 is the on-line TSI and that it has been in an on-line state for a considerable period of time. This means that the BCLK* signal follows the TSI 1 signal from time t0 to t1 as shown on FIG. 6. This being the case, lead ON1*, path 408-1, is low while lead ON0*, path 408-0, is high as shown on FIG. 6. Path 408-0 now applies a high to the D input of latch 401. Path 408-1 now applies a low to the D input of latch 402. The CK input of latches 401 and 402 receives a clock signal on path 403 via inverters 404 and 445-0, whenever the TSOCKL0 signal is received on lead 407-1 during bit 0 of time slot 0 of the off line TSI 0. Each clock signal on lead 403 clocks the potentials currently on the D input of latches 401 and 402 through the latches to their Q outputs. This being the case, the Q output of latch 401 is now a high while the Q output of latch 402 is now a low. This periodic clock edge insures that the latches are updated at each frame boundry at the end of bit 0 time slot 0.

The potentials on the Q outputs of latches 401 and 402 are inverted by inverters 456 and 457 and applied over paths 408 and 409 to an input of each of AND gates 410 and 411, respectively. Thus, the lower input of AND gate 410 receives a low while the lower input of AND gate 411 receives a high. The outputs of inverters 456 and 457 are also applied to exclusive OR gate 422 which now generates a high output signal since its two inut signals are different. This high is applied to gates 410 and 411.

Both inputs of AND gate 411 are currently high. This applies a high from the output of gate 411 to the K-input of flip-flop 413. The output of AND gate 410 is currently low and this low is extended to the J-input of flip-flop 413. As later described, a clock signal appears on lead 423 at the CK input of flip-flop 413 only when the on-line/off-line status of the TSI's 102 changes. The current states of latches 401, 402 and AND gates 410 and 411 are the same now as they were at the time the last TS1 change of state occurred. This being the case, the high on the K-input and the low on the J input of flip-flop 413 reset flip-flop 413 when the clock pulse earlier appeared on lead 423.

In its present reset state, the Q output of flip-flop 413 is low on lead 415 while the not Q output of flip-flop 413 is high on lead 416. The low on lead 415 is propagated through OR gate 417 to lead 420 which extends to the enable (E) input of buffers 424-1 which are enabled by this low. Buffers 424-1 extend the clock signals on paths 406-1 and 407-1 on the right side of the buffers through the buffers to the buffer output leads 425 and 426. The signals on leads 425 and 426 are always extensions of the on-line TSI clock leads 111. The clock signal on lead 426 controls the operation of the circuitry of FIG. 5 at the time the status of the two TSI's switches. The clock signal on lead 425 is inverted by inverters 428-0 through 428-N and applied as the BCLK* signal over paths 114-0 through 114-N to their respective port boards to control the PCM data timing of the port board circuitry.

Thus, in summary of the above, with TSI 1 being the on-line TSI, buffers 424-1 are enabled so that the clock signals TSI 1 on path 406-1 from TSI 1 are extended through the circuit of FIG. 5 and out over buffers 428 and leads 114 to control the operation of the port boards 105. See FIG. 6 and signals BCLK* and TSI 1 from t0 to t5. The current state of the circuit of FIG. 5 remains unchanged so long as TSI 1 remains on the on-line TSI and TSI 0 remains the off-line TSI. It should be mentioned at this time that the output of OR gate 418 is high because of the current state of the circuit of FIG. 5. This high from gate 418 disables buffers 424-0 so that the clock signals from TSI 0 on path 111-0 cannot extend through buffers 424-0 to the circuitry of FIG. 5.

Next, let it assumed that the status of the two TSI's and of the circuitry of FIG. 5 is to be switched to make TSI 0 the new on line TSI. This switch is initiated when processor 101 switches the potentials on leads 408-0 and 408-1. Lead 408-0 becomes low and lead 408-1 becomes high when this switch is initiated. The status of the circuit of FIG. 5 prior to the switch is shown on the timing diagram of FIG. 6. From time t0 to time t1 on FIG. 6, TSI 1 is the on-line TSI and the BCLK* signal follows the TSI 1 signal. Lead ON1* is low and lead ON0* is high. At time t1 processor 101 initiates the switch of TSI's and reverses the potentials on leads ON1* and ON0*. This potential reversal is shown on FIG. 6 and the BCLK* signal continues to follow the TSI 1 signal as shown on FIG. 6.

Figure 6:
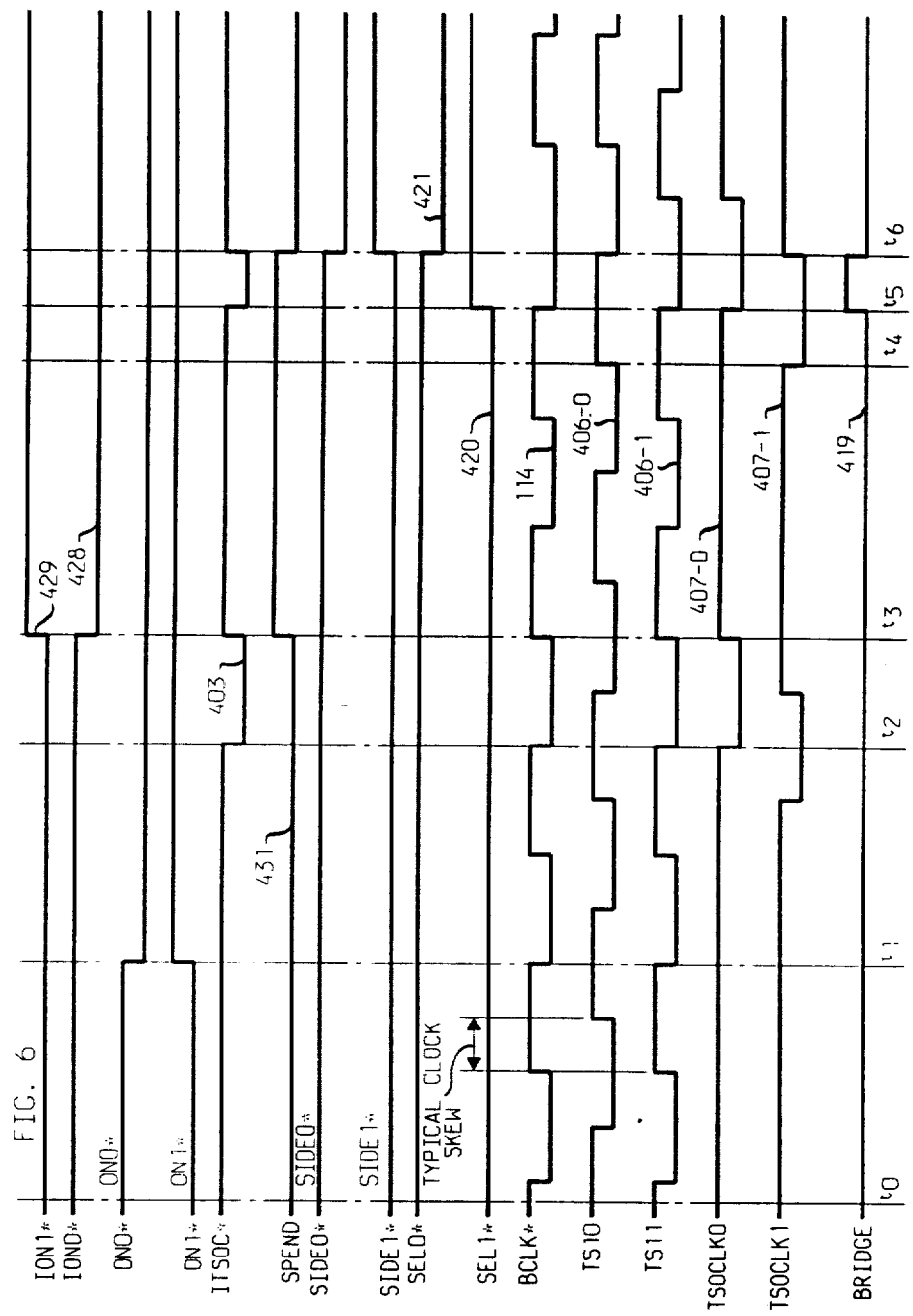
FIGS. 6, 7 & 8 illustrate other system wave forms.

Nothing happens between times t1 and t2 on FIG. 6. At time t2, a trailing edge clock signal TSOCLK0 is received on lead 407-0, inverted by both of inverters 445-0 and 404 and applied to lead 403. However, this trailing edge on path 403 is of no effect since latches 401, 402 are leading edge responsive devices.

A leading edge transition appears on lead 407-0 and, in turn, on lead 403 at time t3. This leading edge clocks the potentials now on the D inputs of latches 401 and 402 through the latches to their Q outputs. Note that the signal on lead 403 is always an extension of the off-line time slot 0 clock signal. The Q output of latch 401 is now low while the Q output of latch 402 is high. These Q output potentials are inverted by inverters 456 and 457 so that inverter 456 supplies a high to an input of AND gate 410 and exclusive OR gate 422. Inverter 457 applies a low to an input of AND gate 411 and exclusive OR gate 422. The output of exclusive OR gate 422 remains high since its two inputs are different. This high from gate 422 extends over path 412 to the lower input of AND gate 438 and to an input on each of AND gates 410 and 411.

The output of AND gate 410 is now high since both of its inputs are enabled. This high extends via path 414 to the J-input of flip-flop 413 and to the lower input of exclusive OR gate 429. The Q output of flip-flop 413 is still low since the flip-flop has not yet received a clock signal on path 423. At this time the two inputs of exclusive OR gate 429 are different since flip-flop 413 has not yet changed state. This produces a high on the output of gate 429 which extends to the upper input of AND gate 438. Both inputs of AND 428 gate are high at this time. This produces a high on its output lead 431. This high occurs only when the inputs and outputs of flip-flop 413 do not match.

Thus, with reference to FIG. 6, lead 431 (SPEND) from gate 438 switches from a low to a high at time t3 when the changed potentials on leads 408-0 and 408-1 are clocked through latches 401 and 402. This high on the path 431 signifies that a command from processor 101 on leads 408-0 and 408-1 has been latched into the circuitry of FIG. 5 to change the on-line/off-line status of the two TSI's.

FIG. 6 shows that lead 431 goes high at time t3. This high extends to the lower input of AND gate 427. Lead 426, the inverted 407-1 signal TSOCLK1, is the other input of AND gate 427 and is low at time t3. This is shown on FIG. 6. The BCLK* signal follows the TSI 1 signal from time t3 to t4.

At time t4 on FIG. 6, lead 407-1 goes low and causes lead 426 of FIG. 5 to go high. Lead 407-1 going low marks bit 0 of time slot 0 for the on-line TSI 1 and therefore the beginning of the interval during which controller 492 will switch the on-line status of the TSIs. Both inputs of AND gate 427 are now high. This causes its output to go high extending to the D input of latch 437. Lead 425 is the clock input to latch 437. It is also the inversion of the TSI 1 signal on path 406-1. At time t5, the TSI 1 clock signal goes from a high to a low which causes lead 425 to go from low to high. This leading edge transition of lead 425 clocks the high on the D input of latch 437 to its Q output.

The Q output of the latch 437 is connected to path 419 (BRIDGE) which is shown on FIG. 6. FIG. 6 shows lead 419 signal going high at time t5 and remaining high until time t6. The high on lead 419 is propagated through OR gates 417 and 418 to leads 420 and 421 which extend to the enable inputs of buffers 424-1 and 424-0. The high on the enable inputs of these buffers disables the buffers so that the clock signals applied to the right side inputs of the buffers does not extend through the buffers to their outputs on the left side. With buffers 424-0 and 424-1 inhibited, the potentials on their outputs 425 and 426 are controlled by resistors R1 and R2. Resistors R1 and R2 hold conductors 425 and 426 at a high potential from time t5 to t6.

The high on path 419 generates a bridge signal which disables buffers 424-1 and 424-0 and holds the BCLK* signal low until it is safe to let the new on-line TSI 0 and its TSI 0 signal control the generation of the BCLK* signal via buffers 424-0 after they are enabled at the end of the high 419 bridge signal. The high on conductor 425 extends to the inputs of inverters 428- to hold the BCLK* signal low on leads 114- extending to the port boards. This low persists for the duration of the bridge signal on path 419.

It is shown on FIG. 6 that the BCLK* signal on lead 114 goes from a high to a low at time t5. The BCLK* signal is still following the TS11 signal at time t5. However from time t5 to t6 it follows the low caused by the bridge signal on path 419. As is subsequently described, at time t6 the bridge signal is removed and the BCLK* signal then follows the then low TSI 0 signal. This completes the transition of the control of the BCLK* signal from the TSI 1 signal to the TSI 0 signal.

The left hand input to AND gate 436 is high at time t5 because of the high on lead 431 from gate 438. Lead 405 on the right hand input of AND gate 436 is the inversion of the TSOCLK0 (lead 407-0) signal shown on FIG. 6. Lead 407-0 goes low at time t5 which, via buffers 445-0, causes lead 405 to go high at time t5.

At this time, both inputs of AND gate 436 are high. This drives the output of gate 436 high which applies a high to the lower input of OR gate 435. This high on the input of OR gate 435 is propagated through the gate to the D input of latch 433. On FIG. 6, the TSI 0 signal (406-0) switches from a high to a low at time t6. On FIG. 5, the TSI 0 signal is extended through buffers 445-0 to lead 444 which is also designated OFFTSI. This lead extends to the clock input of latch 433. Since the TSI 0 signal (406-0) switches from a high to a low at time t6, the inversion of it on path 444 switches from a low to a high at time t6 and applies a leading edge clock signal to latch 433. This clock signal latches the high on the D input of latch 433 to its Q output on path 423. The high going signal on path 423 extends to the clock input of flip-flop 413. There is currently a 1 or high on the J-input of flip-flop 413 and a low or a 0 on its K-input. These potentials cause the Q output of flip-flop 413 to go high and not Q output to go low in response the reception of the clock signal by flip-flop 413. Therefore, there is now a high on path 415 and a low on path 416.

With reference to FIG. 6 it can be seen that at time t6 that the SIDE0* lead 416 switches from a high to a low while the SIDE1* lead 415 switches from a low to a high. Both of these leads are true when low. Since only SIDE0* lead 416 is low at this time, it activates buffer 445-1 and lead 415 inhibits buffer 445-0. This does not occur until the bridge signal 419 is removed as next described.

The bridge signal on lead 419 extending to the inputs of OR gates 417 and 418 is still high at time t6. Therefore, the switching of potential of leads 415 and 416 which extends to the other input of these OR gates 417 and 418 has no effect on their outputs because of the continuing high on lead 419.

At this time, time t6, the J-input of flip-flop 413 is high and the Q output of the flip-flop is also high. This results in a high on both inputs of exclusive OR gate 429. This causes the output of OR gate 429 to apply a low the over lead 430 to the upper input of AND gate 438. This low causes the output of AND gate 438 on path 431 to go low.

This sequence is shown on FIG. 6 which shows the output signal 431 (SPEND) of gate 438 switching from a high to a low at time t6. This low on path 431 of FIG. 5 is inverted by inverter 442 which applies a high to the right hand input of inverting OR gate 440. This causes the output of the OR gate to apply a low over path 432 to the reset (R) input of the latch 437. This low causes the Q output of latch 437 to go low even in the absence of a signal on the clock input of latch 437. Therefore the bridge signal on lead 419 goes low at time t6. This is shown on FIG. 6.

The signal 419 extends to an input on each of OR gates 417 and 418. The switching of this signal to a low at time t6 allows the signals on leads 415 and 416 from flip-flop 413 to control the output signals of these two OR gates. Thus at this time, the output 420 of the OR gate 417 remains high while the output 421 of OR gate 418 goes low. On FIG. 6 it can be seen that signals 420 and 421 were high from time t5 to time t6 during the high state of the bridge signal on lead 419. It can also be seen that when the bridge signal on path 419 goes low on at time t6, the SEL1* signal on path 420 remains high while the SEL0* signal on path 421 goes low. It should be understood that the high signal 419 between times t5 and t6 is the mechanism that held both signals 420 and 421 high between times t5 and t6. Subsequently, the low going state of the 419 signal at time t6 permits the signals on leads 420 and 421 to be controlled by the outputs of flip-flop 413. The output signals of this flip-flop in turn are controlled by the signals on path 408-0 and 408-1. These signals are received from the processor which is the ultimate controlling mechanism insofar as concerns which TSI is to be on-line or off-line.

Figure 7:
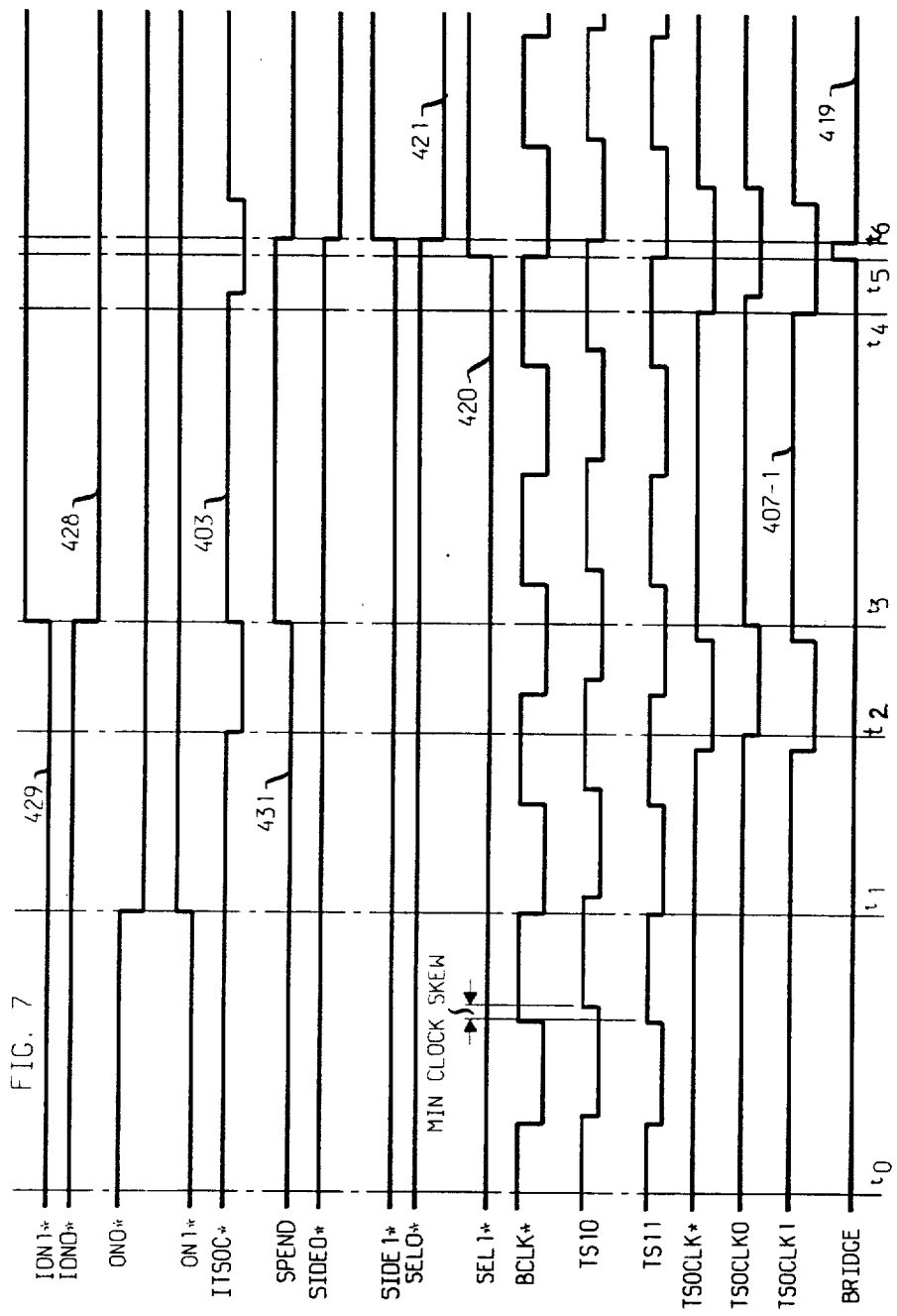
Figure 8:
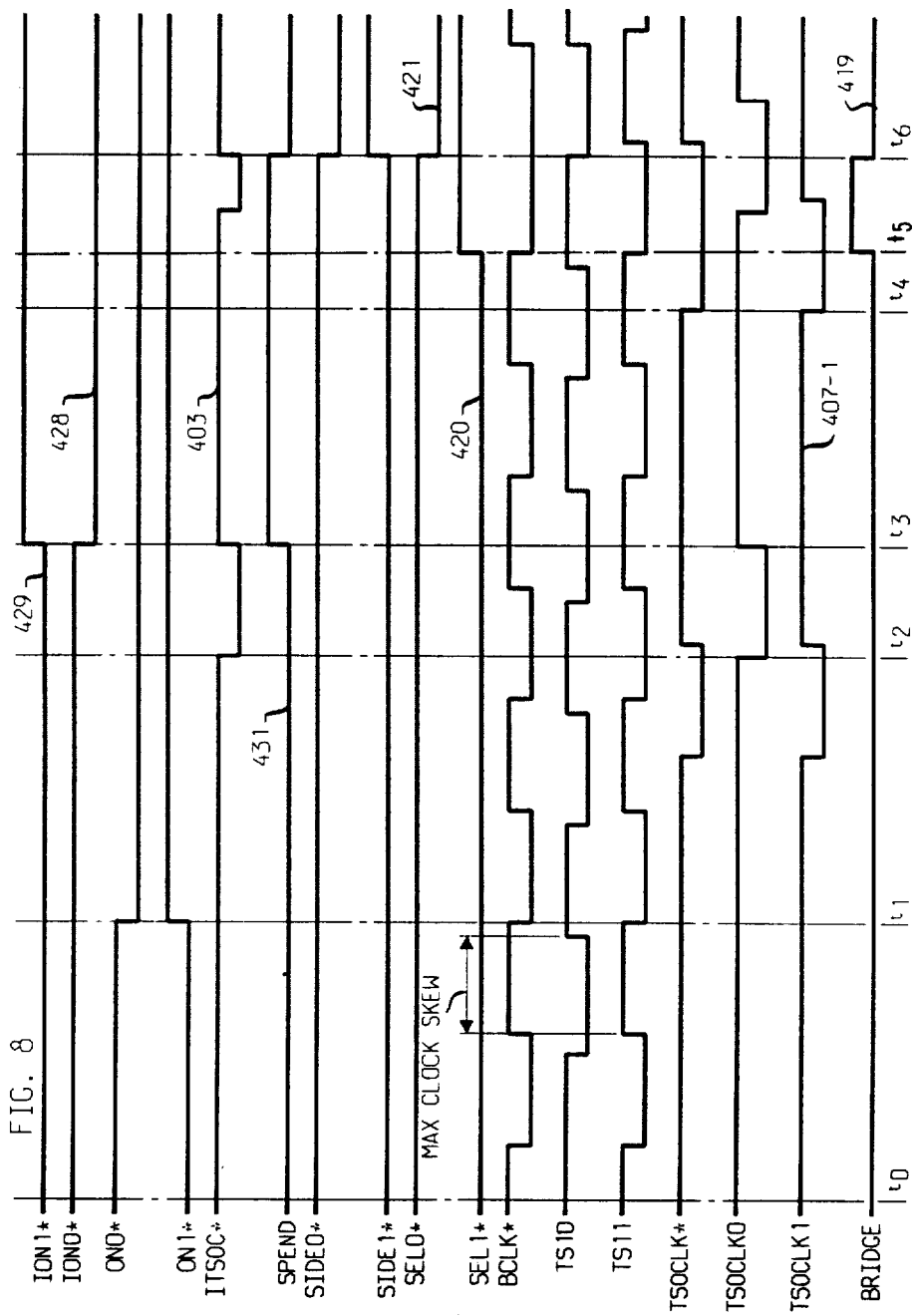

It should be noted in connection with FIG. 6 that the duration of the bridge signal on line 419 is determined by the skew between corresponding edges of the TSI 0 and TSI 1 signals. The narrower the skew, the shorter the 419 signal and vice versa. This phenomenon is shown on FIGS. 6, 7 and 8 each of which portray different widths of the 419 signal resulting from different degrees of skew between the TSI 0 and TSI 1 signals. This feature of controller 492 compensates for variation in the phase of the TSI clocks so that the invention will work with different values of skew.

With the sequence of operations just described, the SEL1* signal on path 420 is now high to inhibit buffers 424-1 while the SEL0* signal is low to enable buffers 424-0. This permits the circuitry of FIG. 5 to respond to the signals from TSI 0 on path 111-0 and not respond to the signals from off-line TSI 1 on path 111-1.

The bit 0 time slot 0 clock signals to latches 401 and 402 on path 403 are now being supplied by path 407-1 from the now off-line TSI 1. This signal appears on path 407-1, it is extended through buffer 445-1 where it is inverted and applied to path 405. From there, it is inverted again by inverter 404 and applied over path 403 to the clock inputs of latches 401 and 402. Therefore, upon each occurrence of the time slot 0 bit 0 signal TS0CLK1 on path 407-1, a clock signal is applied to latches 401 and 402 to clock to their Q outputs the signals on paths 408-0 and 408-1. As long as TSI 0 remains the new on-line TSI, a low is clocked through latch 401 from path 408-0 and a high through latch 402 from path 408-1. The circuit of FIG. 5 remains in this state with the BCLK* signal following the TSI 0 signal from TSI 0 until the on-line/off-line status of the two TSI's asynchronously switch at which time circuit actions similar to that already described take place.

In summary of what has just been described, it can be run at time t0 that TSI 1 was the on-line TSI and that the BCLK* signal to the port boards on paths 114- was following the TSI 1 signal. This can be seen from a study of the TSI 1 and BCLK* signals on FIG. 6. At time t1, processor 101 ordered a change in the status of the two TSI's by switching the ON0* signal from high to low and ON1* signal from low to high. At time t2, the negative going beginning of a pulse on lead 403 was generated by the signal TSOCLK0 on path 407-0 and at time t3 the postiive going transition of the signal 403 clocked the change of states of the ON0* and ON1* signals through latches 401 and 402 to their Q outputs. At time t4 the trailing edge of the TSOCLK1 signal on path 407-1 from TSI 1 goes from a high to a low and remains low until time t6. In conjunction with that, the TSI 1 signal on path 406-1 goes from high to low at time t5. The circuit of FIG. 5 responds by raising the bridge signal on lead 419 from a low to a high. Signal 419 remains high until time t6. The raising of signal 419 from a low to a high holds the enable signals 420 and 421 high for buffers 424 for the duration of the 419 signal. The highs on pathes 420 and 421 inhibit buffers 424-1 and 424-0. This holds the port board's BCLK* signal low under control of the 419 signal for the duration of the 419 signal until time t6. This effectively stretches the duration of the low BCLK* clock pulse supplied to the port boards over paths 114-.

The time slot 0 clock signal TSOCLK0 on path 407-0 goes low at time t5 and the TSI 0 signal goes low at time t6. This causes the bridge signal on path 419 to go low at time t6 which, in turn, allows the BCLK* signal to follow the TSI 0 signal which is now the on-line TSI.

If due to unusual system circumstances both of leads 408-0 and 408-1 should be concurrently low, then both lows are clocked through the latches 401 and 402 which apply equal potentials to the inputs of exclusive OR gate 422. The output of OR gate 422 then remains low. This low on path 412 prevents the above described circuit actions from taking place so that the current on-line TSI does not change status.

The PDI circuitry of FIG. 5 operates to switch the control of the port boards on paths 114 from the signal of a first TSI to the signals of a second TSI as the TSI's change their off-line/on-line status. If it is desired to extend other clock signals from the TSI's through the PDI 104 to the port boards, in addition to the clock signals on paths 111, buffers comparable to 424-0 and 424- could be used for this purpose. The output of such buffers would connect a source of potential via resistors comparable to resistors R1 and R2. The outputs would also extend over paths comparable to path 425 to buffers comparable to buffers 428 and from there to the port boards over paths comparable to paths 114. This would provide an error-free, glitchless source of additional clock pulses as the TSI's change state. The only requirement is that these additional clock signals must be low when its associated time slot 0 clock signal is low from its TSI on path 407-1 or 407-0.

Figure 9:
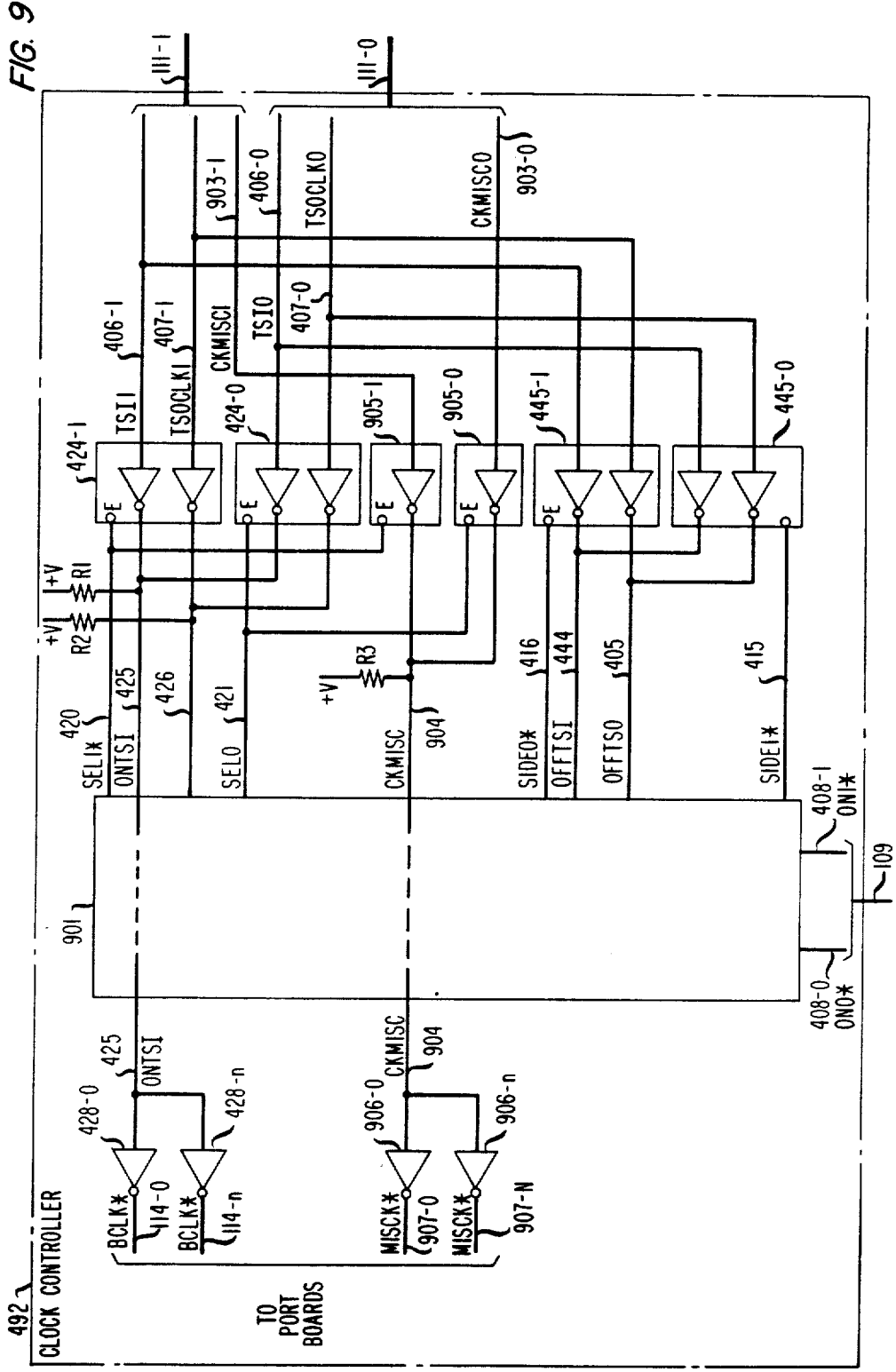
FIG. 9 discloses an alternative PDI clock controller.

FIG. 9 discloses a modification of the circuitry of FIG. 5 that permits a PDI clock controller similar to that of 492 of FIG. 5 to provide a glitchless bridging of an additional source of pulses. The circuit of FIG. 5 provided a glitchless bridging of the TSI 0 and TSI 1 pulses from the two TSI's. These pulses were bridged in a glitchless manner when the TSIs switched state so as to provide a resultant source of pulses on the leads BCLK* to the port boards that are glitch-free and facilitate a stable operation to the port boards. There are many different types of port boards in digital switching systems and these many types of port boards have different operational requirements. The port boards contemplated for use with the arrangement of FIG. 5 are designed to operate under control of a single source of pulses on the BCLK* leads. Other types of port boards may require more than one source of pulses for their operation. When plurality of pulse sources are required, it is still necessary that a glitchless bridging of all sources of clock pulses be provided when the two TSI's change their on-line/off-line status.

FIG. 9 discloses an arrangement for bridging additional sources of clock pulses in addition to the TSI 0 and TSI 1 clock pulses shown on FIG. 5. Paths 111-1 and 111-0 are similar to the similarly designated conductor paths on FIG. 5 in that they each have a time slot 0 clock pulse on a path 407- and a TSI clock pulse on a 406- path. These paths 407- and 406- extend to buffers 424 as shown on both FIGS. 5 and 9 and from there over conductor paths 425 and 426 to element 901 of FIG. 9. The element 901 represents all of the detailed circuitry shown on FIG. 5 other than the input and output buffers 424 and 445 and output buffers 428. One signal output of element 901 extends over paths 425 in the same manner as on FIG. 5 to buffers 428 from there over conductors 114 to the port boards.

In addition, conductor paths 111- of FIG. 9 include an additional source of clock pulses designated CKMISC0 CKMISC1 and numbered 903-. These are the additional of clock pulses from each TSI that must be bridged glitch free and passed through element 901 to paths 907 via buffers 906 and path 904. From paths 907, the additional clock signals are passed to the port board to control their operation in conjunction with the clock pulses on path 114.

Buffers 905-0 and 905-1 of FIG. 9 are controlled by the same leads 420 and 421 that control buffers 424-0 and 424-1. Conductors 420 and 421 are connected to the enable input of buffers 905- and at any given instant of time, one of the 905- buffers is enabled while the other is inhibited. The clock signals applied to an enabled buffer 905- pass through it and through circuitry 901 to path 904 and buffers 906-. Thus, when TSI 0 is the on-line TSI, buffer 905-0 is enabled and the clock pulses on path 903-0 extend through buffer 905-0 to path 904. Conversely, when TSI 1 is the on-line TSI, the clock pulses on path 903-1 passes through enabled buffer 905-1 to conductor 904. The circuitry of element 901 controls which buffer 905- is enabled and which buffer is disabled. At the time of the switch between two TSI's, both buffers 905 are inhibited for the duration of the bridge signal 419 in the same manner as described or buffers 424-. During the bridge signal time, conductor 904 is held high by the potential applied by resistor R3. This holds the conductor 907 low.

The arrangement of FIG. 9 can accommodate the successful glitch-free bridging of as many additional sources of clock pulses as may be desired. The operational requirement associated with the clock pulses is that they must be low during the time duration of the low portion of the time slot 0 bit 0 clock signal on paths 407-0 and 407-1. Although FIG. 9 discloses specifically only one additional source of clock pulses, it is to be understood that the circuitry of the present invention can bridge glitch-free as many additional sources of clock pulses as may be required by the port boards used in the system. The only requirement is that each such additional source of clock pulses must have its own additional buffers comparable to buffers 905- and that these buffers must be controlled in the same manner as are buffers 905-. The outputs of such buffers would extend through element 901 over paths comparable to 904 and be connected to additional buffers comparable to buffers 906- and from there be connected over additional paths comparable to paths 907- extending to the port boards that are to use the additional clock signals.

FIG. 10 discloses further details of clock elements 103-0 and 103-1 of FIG. 1. In the same manner as the TSI's, the two clock elements are always operated so that one is on-line and the other is off-line. The off-line/on-line status of the clock elements is controlled by processor 101 via path 109. The purpose of the clock elements of FIG. 10 is to generate clock signals and apply them to the TSI's so that the TSI's can operate in a controlled manner. The two clocks 103- operate so that the current on-line clock is considered to be a master clock source. The off-line clock is operated as a slave of the on-line clock and the output of the off-line clock is synchronized from the on-line clock. The ouput of the two clocks have a controlled amount of phase delay in that the phase of the on-line clock leads the phase of the off-line clock by 75 nanoseconds, for example, with respect to each other.

The master/slave relationship between the two clocks changes when the on-line/off-line status of the clocks changes. When a switch occurs, the current off-line or slave clock becomes the master clock and the new off-line clock becomes the new slave clock. The purpose of the 75 nanosecond delay between the two clocks is to permit PDI 104 to apply clock signals to the port boards so that no data is lost when the two TSI's switch status. At the time of the switch, the signal of the clock 103 that was the master, but now becomes the slave, is allowed to fall back in time gradually over a period of a few seconds so that is will soon lag the signal from the new on-line clock by 75 nanoseconds.

With respect to FIG. 10 assume that clock 103-1 is currently the master and that clock 103-0 is the slave clock. Switch 1004 of clock 103-1 is currently in its lower position under control of signals from processor 101 via path 109. In this state, the output voltage of reference source 1006 is applied through switch 1004 to the input of the low pass filter 1005. Filter 1005 removes noise and transients that may occur during a switch of the clocks from master to slave. The output of filter 1005 is applied over path 1010 to oscillator 1007. Oscillator 1007 is voltage controlled and the signal on lead 1010 is a control potential that causes oscillator 1007 to run at its specified frequency. The output of oscillator 1007 is applied over path 1011 to divider 1008 which divides the output frequency of oscillator 1007 by a factor of n. The output of divider 1008 is applied as a clock signal source over lead 110-1 to TSI 102-1. This output of divider 1008 is also applied to divider 1009 which divides the output signal of divider 1009 by a factor of m and applies its output to lead 108-1. Lead 108-1 extends to clock 103-0 which is currently assumed to be the slave clock. The circuit details of clock 103-0 are identical to that of clock 103-1 and therefore the signals on path 108-1 are applied within clock 103-0 through inverting buffer 1021 to delay element 1022 which delays all incoming signals by 75 nanoseconds and then applies them to edge detector 1023. The edge detector also receives on path 108-0 the output of a divider 1029. The output of the edge detector is a series of pulses whose polarities and duty cycles are a function of the phase differences between its two input signals. These pulses are applied via switch 1024 in its upper position to low pass filter 1025. The filter smooths out any received transients and passes a DC control signal to oscillator 1027 to cause it to run at the correct frequency so as to minimize the phase difference between the two signals applied to an edge detector 1023. The output of the edge detector 1023 ideally is a voltage that causes oscillator 1027 to operate at the correct frequency. When oscillator 1027 of the off-line clock is not running at the correct frequency, the potential on path 1030 corrects the oscillator so as to bring it to the correct frequency.

The output 110-0 of the off-line clock supplies clock signals to TSI-0 (102-0) that are delayed 75 nanoseconds, for example, with respect to the clock signals on path 110-1. The circuit of FIG. 5 uses the phase delay between the two clock signals to provide glitch free clock signals to the port boards when the TSI's switch then on-line/off-line status. The 75 nanosecond difference between the TSI 0 and TSI 1 signals applied to the circuit of FIG. 5 are shown on FIG. 6.

The operation of the system has been described with respect to a 75 nanosecond phase difference between the TSI 1 and TSI 0 signals. This amount of phase difference is merely exemplary. Other amounts could be used, if desired. The only requirement is that the phase of the clock signal of the on-line TSI lead the clock signal of the off-line TSI by a controlled amount to enable the circuitry of the PDI to perform its function including the generation of the bridge signal at the proper time.

What is claimed is:

1. A method of operating a switching system having duplicated facilities including clock signal sources operated on an on-line/off-line basis, said system comprising facilities for controllable interchanging the on-line/off-line status of said duplicated facilities in a manner that does not cause alterations of the voice and/or data traffic signals then being extended through said system for calls between connected parts of said system; said method comprising the steps of:

(1) generating a clock signal in each of said duplicated sources with the phase of the clock signal of the current on-line source leading the phase of the clock signal of said currently off-line source by n nanoseconds, (2) applying both of said clock signals to a clock control circuit (PDI), (3) operating said PDI to generate an output clock signal under control of said applied clock signal from said current on-line source whereby said output signal has edge transitions corresponding to and coincident with edge transitions of said clock signal of said current on-line source, (4) applying said output signal to clock utilization circuits including said ports of said system to control the transmission of said voice and/or data traffic signals through said system, (5) applying a control signal to said PDI specifying an on-line/off-line status switch of said duplicated facilities including said clock sources, (6) operating said PDI in response to the receipt of said control signal to switch the control of the generation of said output clock signal from the clock signal of said current on-line source to the clock signal of the source that is to be switched from off-line to on-line, and (7) operating said PDI during the interval of said status switch of said duplicated facilities including said clock sources so that said output clock signal generated during the interval of said switch has no additional edge transitions above and beyond of those contained in the clock signals of either one of said sources for the duration of the interval of said status switch.

2. The method of claim 1 wherein said step of operating said PDI during the interval of said status switch comprises the steps of:

(1) generating a bridge signal at the beginning of said status switch interval, (2) preventing a change in the state of said output clock signal while said bridge signal is extant, (3) terminating the generation of said bridge signal at the end of said switch interval thereby allowing said output signal to change state under control of said clock signal of said source that is switched from off-line to on-line.

3. The method of claim 1 wherein said clock signals of each of said sources comprise a cyclically reoccurring series of clock pulses representing time slots in a cyclically reoccurring series of time slots and wherein said step of operating said PDI during said status switch comprises the steps of:

(1) detecting the start of a predetermined time slot of said clock signal of said current on line source, (2) generating a bridge signal in response to said detection, (3) preventing a change in the state of said output clock signal while said bridge signal is extant, (4) detecting the start of a predetermined time slot of said clock signal of said clock source that is being switched from off-line to on-line, and (5) terminating the generation of said bridge signal upon said last named detection whereby said output signal is then generated under control of the clock signal of the clock source that is switched from off-line to on-line.

4. The method of claim 3 wherein said predetermined time slot is the first time slot in a frame of time slots.

5. The method of claim 4 in combination with the step of:

(1) altering the phase of the clock signals of said sources upon the completion of said status switch so that the phase of the clock signal of said source that is switched from off-line to on-line leads by n nanoseconds the clock signal of said source that is switched from on-line to off-line.

6. A method of operating a switching system having duplicated facilities including clock signal sources operated on an on-line/off-line basis, said system comprising facilities for controllably interchanging the on-line/off-line status of said duplicated facilities in a manner that does not cause alterations of the voice and/or data traffic signals for calls then being extended through said system between connected ports of said system; said method comprising the steps of:

(1) applying clock signals to a clock control circuit (PDI) from each of said duplicated clock sources with the phase of the clock signal of the current on-line source leading the phase of the clock signal of the currently off-line source by n nanoseconds, (2) operating said PDI to generate an output clock signal under control of said applied clock signal from said clock source that is currently on-line, (3) applying said output clock signal to clock utilization circuits including said ports of said system to control the transmission of said voice and/or data traffic signals for calls extended through said system between connected ones of said ports, (4) applying a control signal to said PDI specifying that an on-line/off-line status switch is to be made of said duplicated facilities including said clock sources, (5) operating said PDI to switch the control of the generation of said output clock signal from the clock signal of said current on-line source to the clock signal of the source that is to be switched from off-line to on-line, and (6) operating said PDI during the interval of said status switch of said duplicated facilities so that said output clock signal generated by said PDI during the interval of said switch has no additional edge transitions above and beyond of those contained in the clock signals of either one of said duplicated sources for the duration of the interval of said status switch.

7. The method of claim 6 wherein said step of operating said PDI during the interval of said status switch comprises the steps of:

(1) generating a bridge signal at the beginning of said status switch interval, (2) preventing a change in the state of said output clock signal while said bridge signal is extant by inhibiting the application of said clock signals to said PDI from said clock sources, and (3) terminating the generation of said bridge signal at the end of said switch interval whereby said output clock signal is then generated under control of the clock signal from said source that is switched from off-line to on-line.

8. The method of claim 6 wherein said clock signals of each of said sources comprise a cyclically reoccurring series of clock pulses representing time slots in a cyclically reoccurring series of time slots and wherein said step of operating said PDI during said status switch comprises the steps of:

(1) detecting the start of a predetermined time slot of said clock signal of said current on line source, (2) generating a bridge signal in response to said detection, (3) preventing a change in the state of said output clock signal while said bridge signal is extant, (4) detecting the start of a predetermined time slot of said clock signal of said clock source that is being switched from off-line to on-line, and (5) terminating the generation of said bridge signal upon said last named detection whereby said output signal is then generated under control of the clock signal of the clock source that is changed from off-line to on-line.

9. A method of operating a switching system to switch the control of said system between the clock signals of a first and a second signal source in a manner that does not cause alterations of the voice and/or data traffic signals for calls then being served between ports of said system; said method comprising the steps of:

(1) generating clock signals in each of said sources with the phase of the clock signal of a first source leading the phase of the clock signal of the second one of said sources by n nanoseconds, (2) applying both of said clock signals to a clock control circuit (PDI), (3) operating said PDI to generate an output clock signal under control of said applied clock signal from said first source, (4) applying said output clock signal to clock utilization circuits including ports of said system to control the transmission of voice and/or data call signals through said system between connected ones of said ports, (5) operating said PDI to switch the control of the generation of said output clock signal from the clock signal of said first source to the clock signal of said second source, and (6) operating said PDI during the interval of said switch so that said output clock signal generated during said interval has no additional edge transitions above and beyond of those contained in the clock signals of either one of said sources for said interval.

10. The method of claim 9 wherein said clock signals of each of said sources comprise a cyclically reoccurring series of clock pulses representing time slots in a cyclically reoccurring series of time slots and wherein said step of operating said PDI during said switch comprises the steps of:
  (1) detecting the start of a predetermined time slot of said clock signal of said current on line source,
  (2) generating a bridge signal in response to said detection,
  (3) preventing a change in the state of said output clock signal while said bridge signal is extant,
  (4) detecting the start of a predetermined time slot of said clock signal of said clock source that is being switched from off-line to on-line, and
  (5) terminating the generation of said bridge signal upon said last named detection whereby said output signal is then generated under control of the clock signal of the clock source that is changed from off-line to on-line.

11. A switching system having means for controllably interchanging the on-line off-line status of duplicated facilities including clock signal sources in a manner that does not cause alterations of the voice and/or data traffic signals for call connections then being served between connected ports of said system, said system further comprising;
  means for generating clock signals in each of said clock sources with the phase of the clock signal of the current on-line clock source leading the phase of the clock signal of said current off-line clock source by n nanoseconds,
  means for applying both of said clock signals to a clock control circuit (PDI),
  means in said PDI responsive to the receipt of said clock signals for generating an output clock signal under control of said applied clock signal from said current on-line clock source whereby said output clock signal has edge transitions corresponding to and coincident with edge transitions of said clock signal of said current on line source,
  means responsive to said generation for applying said output clock signal to clock utilization circuits of said system including said ports to control the transmission of voice and/or data signals on calls through said system between said ports,
  means for applying a control signal to said PDI specifying an on-line/off-line status switch of said duplicated facilities including said clock sources,
  means responsive to the receipt of said control signal by said PDI for switching the control of the generation of said output clock signal from the clock signal of the current on-line source that is being switched from on-line to off-line to the clock signal of the source that is being switched from off-line to on-line, and
  means for operating said PDI during the duration of said status switch of said duplicated facilities so that said output clock signal generated during said duration has no additional edge transitions above and beyond those contained in the clock signal of either one of said duplicated sources for duration of said status switch.

12. The system of claim 11 wherein said last named means comprises;
  means for generating a bridge signal at the beginning of the duration of said status switch,
  means controlled by said bridge signal for preventing the generation of any edge transitions in said output clock signal while said bridge signal is extant, and
  means for terminating the generation of said bridge signal at the end of said status switch whereby said output clock signal is subsequently generated under control of said clock signal of said source that is switched from off-line to on-line.

13. The system of claim 11 wherein said clock signals of said sources comprise a cyclically reoccurring series of clock pulses representing time slots in a cyclically reoccurring series of time slots and wherein said means for operating said PDI during said switch comprises;
  means for detecting the start of a predetermined time slot of said clock signal of said current on line source,
  means for generating a bridge signal in response to said detection,
  means controlled by said bridge signal for preventing the generation of any edge transitions in said output clock signal while said bridge signal is extant,
  means for detecting the start of a predetermined time slot of said clock signal of said clock source that is being switched from off-line to on-line, and
  means for terminating the generation of said bridge signal upon said last named detection whereby said output signal is then generated under control of the clock signal of the clock source that is switched from off-line to on-line.

14. The system of claim 13 wherein said predetermined time slot is the first time slot in a frame of time slots.

15. The system of claim 14 in combination with means for altering the phase of the clock signals of said sources upon the completion of said status switch so that the phase of the clock signal of said source that is switched from off-line to on-line leads by n nanoseconds the clock signal of said source that is switched from on-line to off-line.

16. The system of claim 14 in combination with; means effective prior to the initiation of said status switch for detecting the occurrence of a predetermined time slot of the clock signal of said off-line source,
  a register in said PDI,
  means responsive to said detection for entering said signal into said register of said PDI,
  and means responsive to said registration for initiating said status switch by said PDI.

17. The system of claim 16 wherein said last named predetermined time slot is time slot 0 bit 0 of the clock signal of said source that is currently off-line.

18. A switching sytem having facilities for switching the control of said system between clock signals of a first and a second clock signal source in a manner that does not cause alterations of the voice and/or data traffic signals for call connections then being served by said system between connected ports of said system, said system further comprising;
  means for generating clock signals in each of said sources with the phase of the clock signal of a first one of said sources leading the phase of the clock signal of a second one of said sources by n nanoseconds, means for applying both of said clock signals to a clock control circuit (PDI), means in said PDI for generating an output clock signal under control of said applied clock signal from said first source, means for applying said output clock signal to clock utilization circuits of said system to control the transmission of voice and/or data signals on calls through said system between connected ports, means in said PDI for switching the control of the generation of said output clock signal from the clock signal of said first source to the clock signal of said second source, and means for operating said PDI during the interval of said switching so that said output clock signal generated during said interval has no additional edge transitions above and beyond of those contained in the clock signal of either one of said duplicated sources for the duration of said interval.

19. The system of claim 18 wherein all of said clock signals are square waves and wherein all edge transitions of said output clock signal are coincident with corresponding transitions of said clock signal of the one of said sources that is currently in control of generating said output clock signal.

20. The system of claim 19 wherein said last named means comprises;

means for generating a bridge signal during the interval of said switching, means controlled by said bridge signal for preventing the generation of any edge transitions in said output clock signal while said bridge signal is extant, and means for terminating the generation of said bridge signal at the end of said switching interval whereby said output clock signal is subsequently generated under control of said clock signal of said second source.

21. The system of claim 19 wherein said clock signals of said sources each comprise a cyclically reoccurring series of clock pulses representing time slots in a cyclically reoccurring series of time slots and wherein said means for operating said PDI during said switch comprises;

means for detecting the start of a predetermined time slot of said clock signal of said first source, means for generating a bridge signal in response to said detection, means controlled by said bridge signal for preventing the generation of any edge transitions in said output clock signal while said bridge signal is extant, means for detecting the start of a predetermined time slot of said clock signal of said second source, and means for terminating the generation of said bridge signal upon said last named detection whereby said output signal is then generated under control of the clock signal of said second source.

22. The system of claim 21 wherein said predetermined time slot is the first time slot in a frame of time slots.

23. The system of claim 22 in combination with means for altering the phase of the clock signals of said sources upon the completion of said switching interval so that the phase of the clock signal of said second source leads by n nanoseconds the phase of the clock signal of said first source.

24. An output clock signal generation system having facilities for switching the control of the generation by said system of an output clock signal between clock signals of a first and a second clock signal source, said system comprising;

means for generating clock signals in each of said sources with the phase of the clock signal of a first one of said sources leading the phase of the clock signal of a second one of said sources by n nanoseconds, means for applying both of said clock signals to a clock control circuit (PDI), means in said PDI for generating said output clock signal under control of said applied clock signal from said first source, means in said PDI for switching the control of the generation of said output clock signal from the clock signal of said first source to the clock signal of said second source, and means for operating said PDI during the interval of said switching of said so that said output clock signal generated during said interval has no additional edge transitions above and beyond of those contained in the clock signal of either one of said sources for the duration of said interval.

25. The system of claim 24 in combination with means for altering the phase of the clock signals of said sources upon the completion of said switching interval so that the phase of the clock signal of said second source leads by n nanoseconds the phase of the clock signal of said first source.

* * * * *

UNITED STATES PATENT AND TRADEMARK OFFICE
CERTIFICATE OF CORRECTION

PATENT NO.   : 4,635,249

DATED        : January 6, 1987

INVENTOR(S)  : Edward J. Bortolini, John S. Helton, Dwight W. Kohs

It is certified that error appears in the above-identified patent and that said Letters Patent is hereby corrected as shown below:

Column 7, line 41, delete "Whitmore"
and substitute --Witmore--,
delete "448,549"
and substitute --4,485,469;
line 42, delete "Whitmore"
and substitute --Witmore--.

Signed and Sealed this

Fifth Day of July, 1988

Attest:

DONALD J. QUIGG

*Attesting Officer*  *Commissioner of Patents and Trademarks*